Oct. 14, 1930.  M. SHETLER  1,778,280
WATER SOFTENING AND REGENERATING APPARATUS
Filed June 7, 1928  4 Sheets-Sheet 1
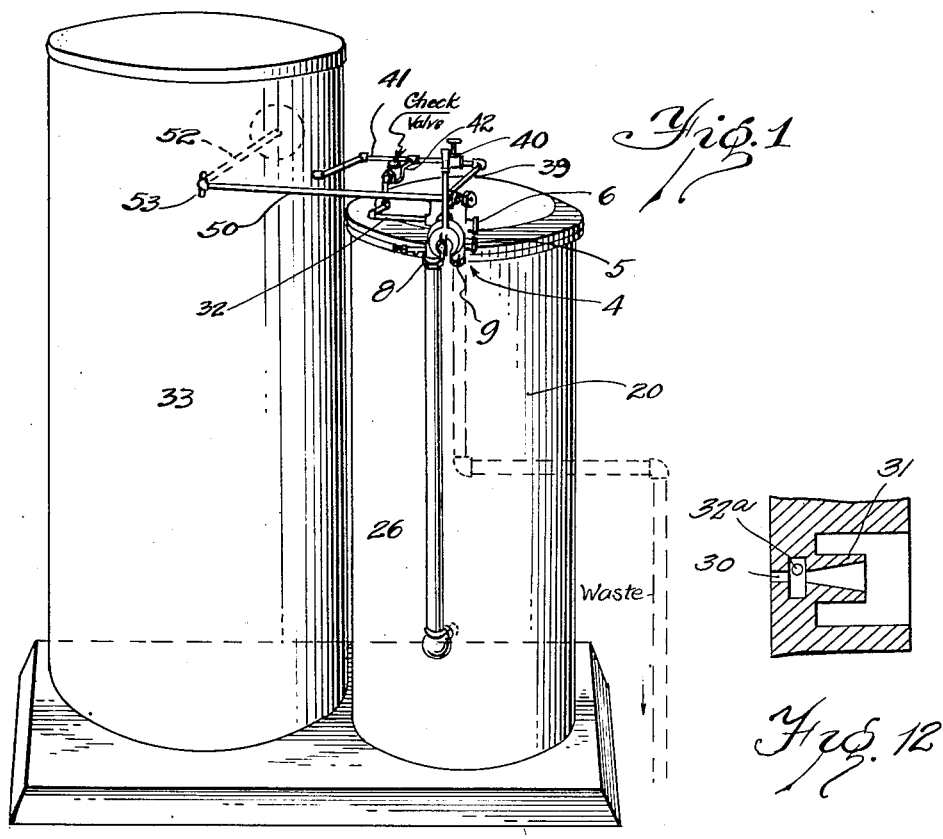
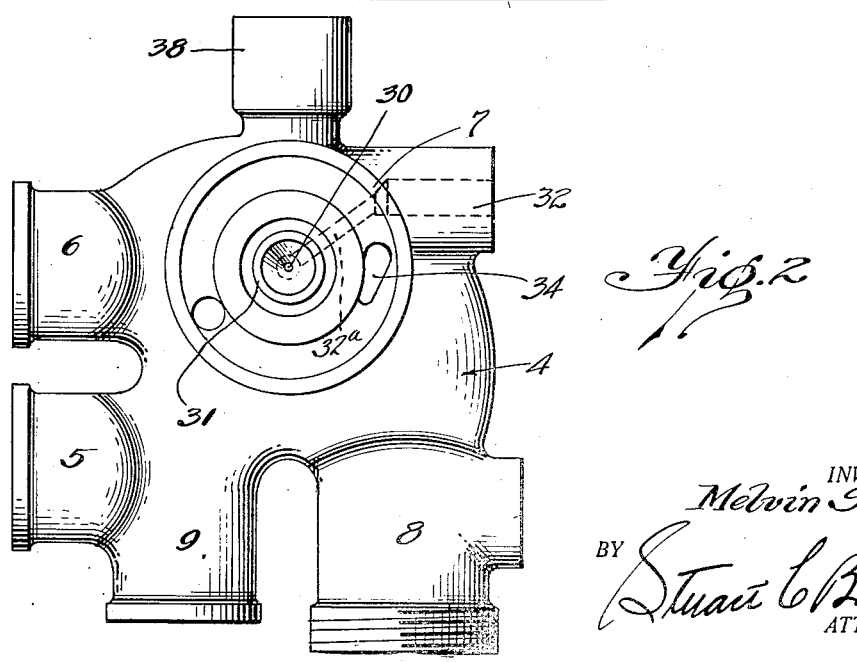
INVENTOR.
Melvin Shetler
BY Stuart C. Barnes
ATTORNEY.

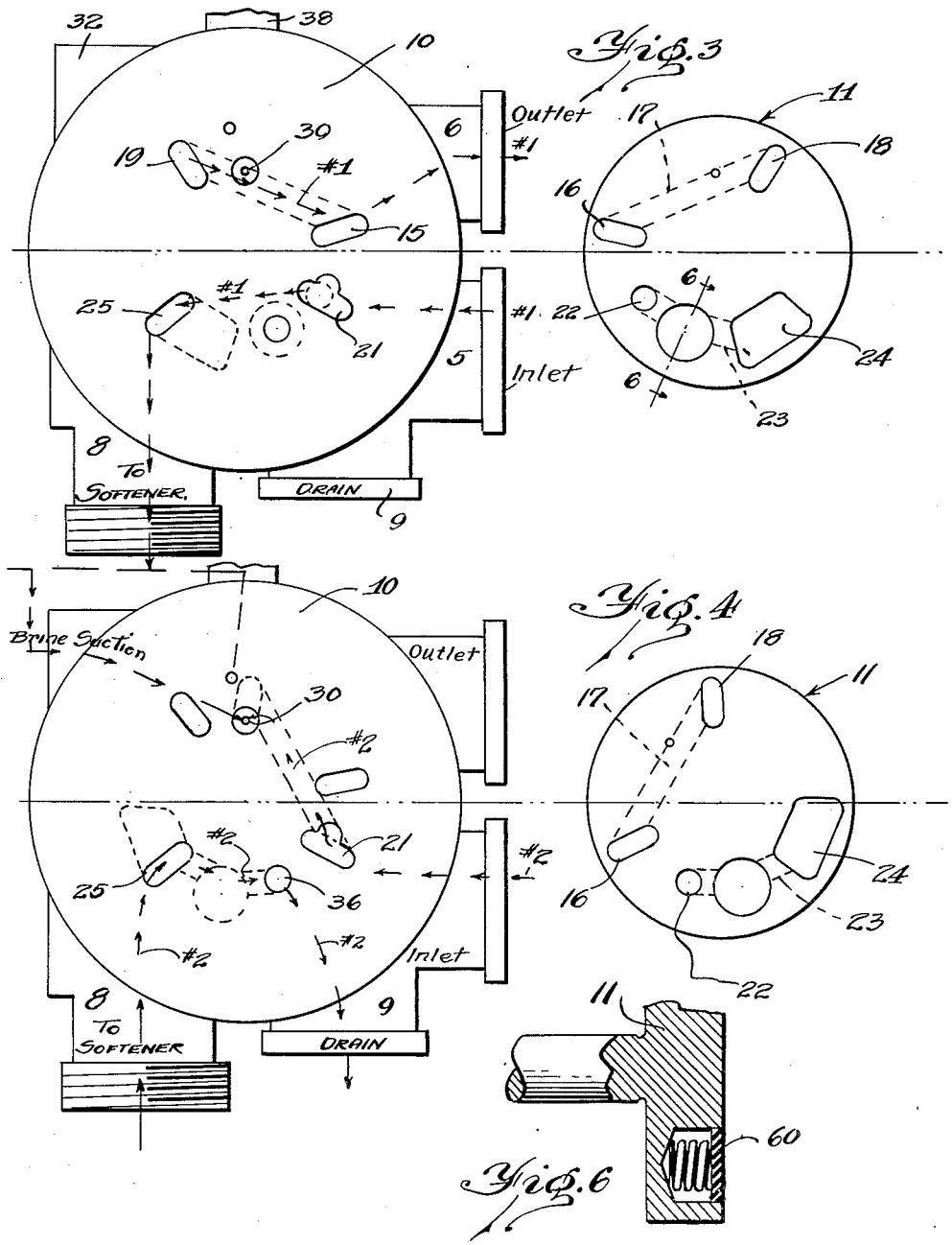

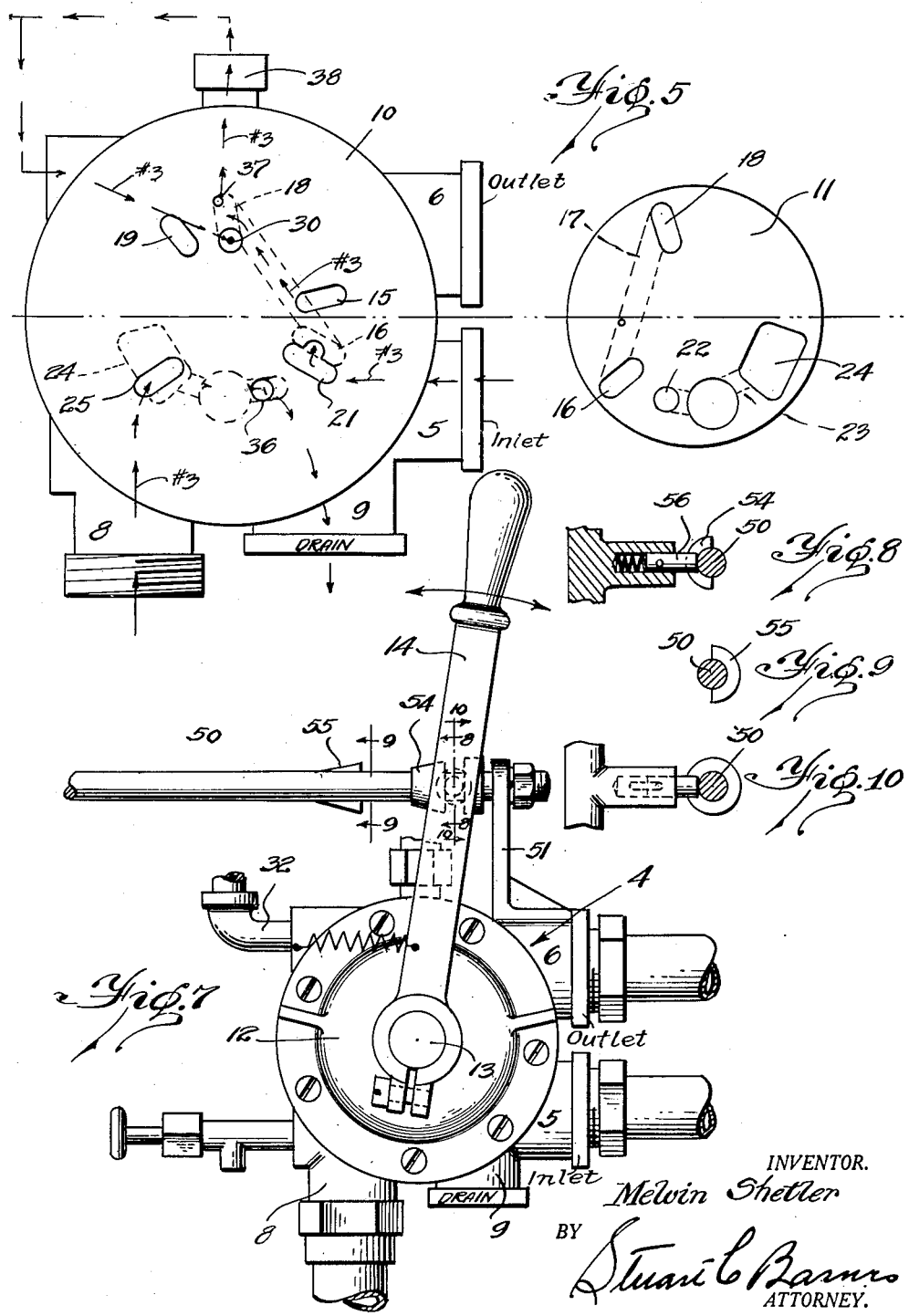

Oct. 14, 1930.  M. SHETLER  1,778,280
WATER SOFTENING AND REGENERATING APPARATUS
Filed June 7, 1928  4 Sheets-Sheet 4
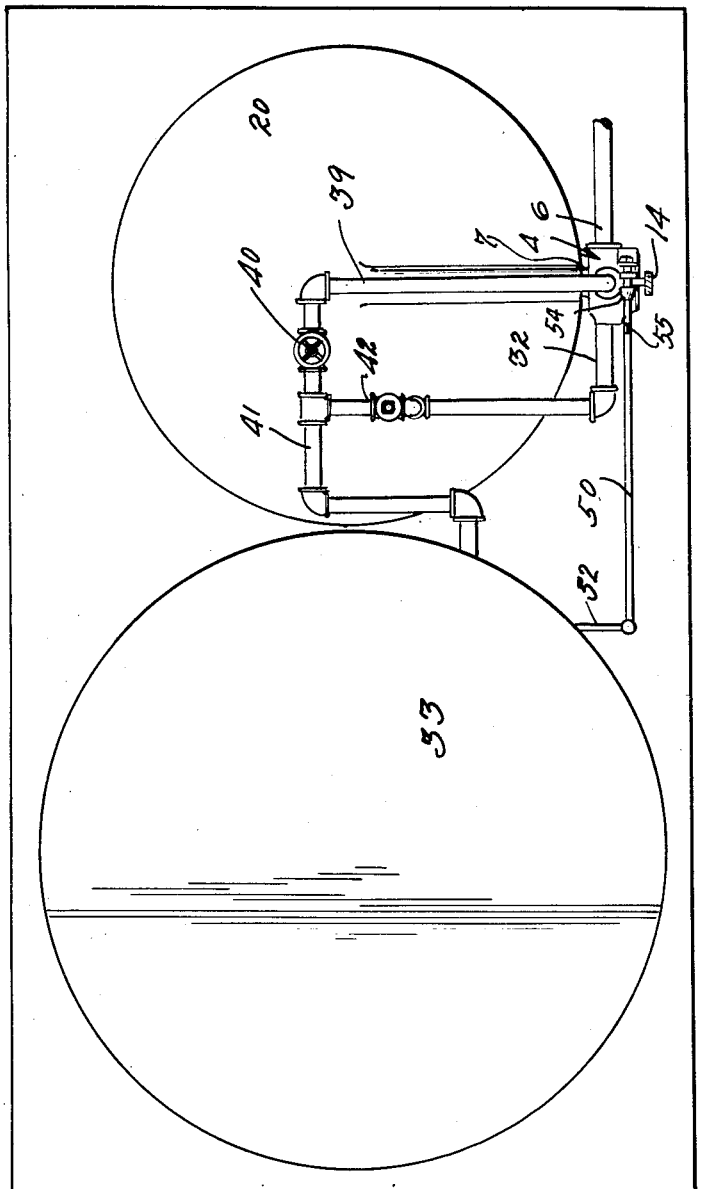
INVENTOR.
Melvin Shetler
BY
ATTORNEY.

Patented Oct. 14, 1930

1,778,280

UNITED STATES PATENT OFFICE

MELVIN SHETLER, OF FLINT, MICHIGAN

WATER SOFTENING AND REGENERATING APPARATUS

Application filed June 7, 1928. Serial No. 283,512.

This invention relates to water softening and regenerating apparatus, and has to do particularly with semi-automatic means for controlling the softening of the water and the regeneration and the cleansing of the softening means.

Heretofore, water softening apparatus has been of two general types, one known as the manually operated type and the other as the completely automatic type. Apparatus of the hand operated type has proved efficient if given the proper attention and care, but much trouble has been experienced with this type of structure due to the fact that valves or other operating parts have been turned on and forgotten with the consequent result of large wastage and inefficient operation. The automatic type of softening apparatus, while efficient, has heretofore involved so many complicated parts as to make the same not only relatively expensive but unusually liable to repair.

It is the object of the present invention to provide means for positively and accurately controlling the regeneration of the water softening means in a manner and with structure which is substantially just as simple and inexpensive as the control structure heretofore utilized in connection with manually operated water softening apparatus. More specifically, the present invention contemplates a device which is semi-automatic in that it requires a manual operation to start the same but which is automatic and positive in the sequence of operations after the initial manual operation.

A further feature of the present invention has to do with the provision of a novel valve structure for controlling the flow of water to the softener, the flow of brine to the softener, and the flushing of the brine from the softener, the entire operation of said valve, with the exception of its initial manual actuation, being automatically controlled by a float positioned in a single brine tank.

A still further feature of the present invention resides in the provision of a liquid cut-off whereby the normal hard water supply is utilized to cut off the flow of brine to the softening tank and at the same time control the raising of the float in the brine tank, whereby the amount of cleansing water passed through the softening tank will be controlled by the raising of the float in the brine tank. In this construction the hard water is so controlled as to perform three separate operating functions: (1) That of a liquid shut-off valve for the brine; (2) the means for regulating the return of upward movement of the float in the brine tank; and (3) the means for flushing the brine from the softening tank.

Other features including the various details of construction will be brought out in the specification and claims appended thereto.

In the drawings:

Fig. 1 is a perspective view of the water softening and regenerating apparatus constructed in accordance with the present invention and illustrating the simplicity of the parts.

Fig. 2 is a rear view of the valve structure and showing in particular the injector for forcing the water and brine into the softening tank.

Fig. 3 is a diagrammatic view of the valve structure in normal softening position, the rotatable valve seat being shown removed from its normal position to show the corresponding positions of the various ports.

Fig. 4 is a view similar to Fig. 3 but showing the rotatable valve seat moved to regenerating position.

Fig. 5 is a view similar to Figs. 3 and 4 but showing the rotatable valve seat as being moved to flushing position, the dotted lines and arrows in the stationary part of the valve indicating the flow of hard water and brine.

Fig. 6 is a view taken on line 6—6 of Fig. 3.

Fig. 7 is a front elevation of the valve structure shown in Figs. 1 and 2, and illustrating the cam for controlling the valve lever and showing the valve lever in initial regenerating position.

Fig. 8 is a sectional view taken on line 8—8 of Fig. 7 and showing the position of the valve handle and pin with relation to the regenerating cam.

Fig. 9 is a section taken on line 9—9 of Fig.

7 and showing the position of the flushing cam on the shaft with relation to the regenerating cam.

Fig. 10 is a sectional view taken on line 10—10 of Fig. 7.

Fig. 11 is an enlarged plan view of the various pipe connections between the main control valve, the regenerating tank, and the liquid shut-off valve.

Fig. 12 is a fragmentary sectional view, partly diagrammatic, illustrating the injector structure as shown in Fig. 2 and the fresh water and brine connections to said injector.

It will be obvious that the dotted lines shown in the stationary part 10 of the valve, in the diagrammatic Figures 3, 4, and 5, illustrate the relative positions of the ports and passageways of the movable part 11 of the valve in the different operating positions it assumes relative to the stationary part 10.

It will be understood that the apparatus embodied in the present invention is quite similar to standard manually operated water softening apparatus. The valve structure may be generally designated 4 and comprises a main housing, as shown in Fig. 2 having the inlet 5 for the hard water to be softened, and the outlet 6 for the softened water. The main outlet to the top or head of the water softening or mineral tank is by means of the conduit 7 (see Fig. 2), and the main outlet or inlet as the case may be to the bottom of the softening tank is by means of the conduit 8. A suitable drain 9 is provided for draining the water softener when required.

All these inlets or outlets have suitable passageways leading to the ports on the face of the main valve, as best illustrated in Figs. 3, 4, and 5. This main valve consists of the face 10 which is provided with the various ports, as shown, and which is stationary and forms part of the main housing of the valve. The other part of this main valve may be generally designated 11 and comprises a rotatable valve member which is positioned within a housing cap 12 (see Fig. 7) and which rotatable valve member is provided with a suitable shaft 13 which extends through said housing cap and is secured to a valve operating handle 14.

As best shown in Fig. 3, the outlet 6 is connected with a port 15 in the face 10 of the valve and this port 15 registers with a port 16 in the rotatable valve member. The port 16 in the valve 11 is connected by a suitable passageway 17 with a port 18 which registers in normal position with a port 19 in the face 10. This port 19 in turn is connected by a suitable passageway 34 (see Fig. 2) with the conduit 7 which leads to the top or head of the water softening tank which may be designated 20.

The inlet 5 is connected by a suitable passageway to a port 21 in the face of the member 10 and this port registers when the valve is in normal softening position with a port 22 in the valve member 11. The port 22 is connected by means of a passageway 23 with the enlarged port 24, which in turn is adapted to register, as shown in dotted lines in Fig. 3, with a port 25 in the valve 10. This latter port 25 is directly connected to the conduit 8 which leads to the bottom of the softener 20 as by means of a pipe 26. It will thus be obvious that as the rotatable valve member 11 is positioned with relation to the valve face 10 as indicated by the dotted lines in Fig. 3 that water will flow in the inlet 5 through the port 22, passageway 23, and port 24 of the valve member 11 and into the port 25 and the softener 20 as shown by the arrows in Fig. 3. It will then rise in the softener 20, through the material which removes the calcium and magnesium and the softened water will then pass through the conduit 7 into the back portion of the valve housing and through the registering ports 19 and 18, passageway 17 and ports 16 and 15 to the normal water supply means. This normal position of the valve members and direction of the water flow may be designated No. 1.

The face 10 of the valve housing is provided with a small aperture 30 which is directly connected to an injector 31 (see Fig. 2) which leads to the top of the water softening tank. A conduit 32 is adapted to be connected to a brine tank 33 and this conduit 32 in turn is connected by means of a suitable passageway 32ª in the valve housing 4 with the inlet end of the injector 31, as best shown in Figs. 2 and 3. It will thus be seen that as water is forced through the aperture 30, which is of a predetermined size, and through the injector 31 that brine will be drawn from the brine tank through the conduit 32 and that this brine will be conducted into the water softening tank 20.

In Fig. 4 I have shown the valve 11 as being rotated to a position wherein the port 21 is connected with the aperture 30, and the port 25 is connected with a drain port 36. When the valve 11 is in this position the hard water will be conducted from the port 21 through the passageway 17 through the aperture 30 and through the injector 31 whereby to draw in a supply of brine and conduct the same to the water softening tank to effect regeneration of the chemicals therein. The material precipitated from the water softening material together with some of the brine will be forced up through the conduit 26 through the conduit 8 and by way of the port 25 and port 36 to the drain. This positioning of the valve members and the direction of flow of the water and brine is the No. 2 position, as best illustrated in Fig. 4.

As the valve member 11 is then rotated slightly back towards its normal position, the port 18 will register with the aperture 30 and a second aperture 37 which has a larger orifice than the aperture 30. In this position the port 16 will also register with the port 21 whereby the hard water from the inlet will be conducted through both the aperture 30 and the aperture 37. In this same position the port 24 will still remain in registry with the port 25 and the port 22 will also be in registry with the outlet port 36 which leads to the drain.

A very important feature connected with the orifices 30 and 37 is that the orifice 37 being larger will, by the structure to be described, automatically cause the brine to be shut off merely by the flow of the hard water. The port 37 is connected to an outlet conduit 38 which outlet conduit 38 is connected by means of a pipe 39 and valve 40 and pipe 41 to the brine tank 33. An intermediate pipe 42, provided with a check valve, connects the pipe 41 and the pipe 32, said pipe 32 being the main inlet for the brine into the valve housing.

When the valve is rotated to position shown in Fig. 5 whereby the port 21 is connected to the orifice 37 a supply of hard water flows through the orifice 37 up through the conduit 38 and through the valve 40 towards the brine tank. The flow of water passing through this pipe 39 and the valve 40 is greater than the flow of brine which is being drawn through the softening tank. As this flow is greater it will force the brine back into the brine tank and a portion of the hard water will also flow into the brine tank to gradually raise the level thereof. The remaining water flows through the pipe 42, past the check valve, through the pipe 32 and into the top of the water softening tank 20, just as the brine had been drawn into this tank a moment before. It will thus be obvious that fresh hard water will flow through the softening tank 20 and flush the same of brine until the valve is again turned to normal softening position, such as shown in Fig. 3.

The operating structure for controlling these three positions of the valve consists of a very simple structure which includes a cam member 50 which is rotatably supported by means of a suitable bracket 51 on the valve housing and the other end of which is rotatably connected to a float valve 52, the connection 53 between the float valve and the cam shaft 50 being adjustable for the purpose to be described. The cam shaft 50 is provided with a cam 54 which may be designated the regenerating cam and a second but oppositely positioned cam member 55 which may be termed the flushing cam. The lever 14 is provided with a suitable spring pressed plunger 56, as best shown in Fig. 8, and while this plunger is normally in contact with the shaft 50 it also may be retracted to permit the lever 40 to be moved past the cam member 54.

In the normal operating position, as shown in Fig. 3, the valve handle 14 assumes a position to the left as viewed in Fig. 1. In regenerating position, the valve handle is moved manually to the position shown in Fig. 7 wherein the plunger 56 is in contact with the cam 54. In this position, brine will be gradually emptied from the brine tank, as previously described, and as this will lower the float 52 it will be obvious that the cam shaft 50 will be turned until the cam 54 releases the plunger 56 at which point the lever 14 will be moved by means of a suitable spring back into contact with the cam 55 at which point the lever 14 will be substantially vertical as shown in Fig. 1.

This is position No. 3, as shown in Fig. 5 and in this position the hard water will flow through the orifice 37 which water will act as a valve against the brine and also fill the brine tank. As the brine tank gradually fills it will be obvious that the cam shaft will be rotated in the opposite direction and the brine tank will continue to be filled until the cam 55 releases the plunger 56, thus permitting the valve member 14 to be returned to normal or No. 1 position.

In the normal operation of the flushing period enough surplus water is allowed to flow through the orifice 37 and against the brine to cause the float to rise to normal position in about thirty minutes. This raising of the float must not be too fast or it will not allow the mineral tank to be properly flushed out. The valve 40 is thus included in the line to regulate the flow according to the hardness of the water at any particular locality. In other words, if the water is very hard, or if a larger softening tank is used, the valve 40 is slightly closed in order to effect a slower raising of the float 52.

The adjustment 53 between the float and the cam shaft 50 is to allow the float to go down into the brine tank varying distances before the lever 14 is released or tripped to allow the hard water to shut off the brine supply.

It will thus be seen that the valve member 14 will be normally positioned at the extreme left and that the valve members 10 and 11 will be normally positioned as shown in Fig. 3. Movement of the lever member 14 to the position shown in Fig. 7 will cause the pin 56 to engage the cam 54 whereby the valve members 10 and 11 will be relatively positioned as shown in Fig. 4 which is known as position No. 2 or the regenerating position, wherein brine is caused to flow through the mineral tank or water softening tank 20 to regenerate the same.

The next position of the valve member is automatically controlled in that as soon as the float 52 lowers to a predetermined position, the cam 54 will release the pin 56 and the valve handle 14 and valve 11 will be moved to flushing position or the position illustrated in Fig. 5 wherein the hard water normally entering the valve housing will be utilized to automatically shut off the flow of brine, to replenish the brine tank, and to serve as a flushing medium for the mineral tank. This latter position, or position No. 3, will be automatically maintained until the brine level is raised at a predetermined rate and to a predetermined point, when the cam 55 will release the pin 56 to allow the lever 14 to move back to normal position or what is known as the water softening position, as illustrated in Fig. 3.

It will thus be seen that the entire operation is semi-automatic in that the valve must first be moved manually to regenerating position. This is all the care that is required, however, and once the valve is moved to this position the succeeding operations are completely automatic and also controlled completely by the height of brine in the brine tank and the rate of flow of surplus of hard water during the flushing operation. It will thus be seen that metering devices are entirely done away with and that the device is substantially the same as a standard hand operated apparatus with the slight addition of the cam shaft and the arrangement of pipes for controlling the shut off of brine by the incoming hard water.

As shown in Fig. 6 a spring pressed valve disc 16 is preferably utilized as a precautionary means to keep the drain port 36 closed in the normal position of the valve members, as shown in Fig. 3.

The injector apparatus 30 is never closed but is kept open to prevent stoppage, a suitable aperture being provided in the valve 11, as shown in Fig. 3 for registering with the aperture 30 in the normal position of the two valve members. As the softening tank is usually under approximately sixty pounds pressure, a check valve is provided in the line 42 as shown in Fig. 1.

It will thus be seen that the injector orifice 30 is not only open in positions 2 and 3 but is also open during the softening period so that in case any foreign particles should lodge over said opening during the regenerating or flushing periods such particles will be blown off during the softening period.

An additional feature of the liquid valve is that it back-washes the brine line and prevents corrosion and stoppage.

What I claim is:

1. The method of softening water, which includes the successive operations of softening, regeneration, and flushing, which comprises controlling the regeneration operation by the amount of regenerating liquid used, and cutting off the supply of regenerating liquid by the incoming supply of flushing liquid.

2. The method of softening water, which comprises subjecting the water to successive operations of softening, regeneration, and flushing, controlling the regeneration operation by the amount of regenerating liquid used, and cutting off the supply of regenerating liquid by the incoming supply of flushing liquid, raising the level of the regenerating liquid by a portion of said flushing liquid and controlling the period of flushing by the amount of flushing liquid passing to the supply of regenerating liquid.

3. The method of softening water and controlling the successive operations of softening, regeneration, and flushing, which comprises manually controlling the initiating of the regenerating operation and automatically controlling the length of the regenerating operation and the flushing operation by the height of the regenerating liquid in its supply container.

4. The method of softening water and controlling the successive operations of softening, regenerating, and flushing, which comprises manually controlling the initiating of the regenerating operation and stopping the regenerating operation and starting the flushing operation by utilizing the normal supply of hard water to act as a valve and shut off the supply of regenerating liquid.

5. The method of softening water and controlling the successive operations of softening, regenerating, and flushing, which comprises manually controlling the initiating of the regenerating operation and stopping the regenerating operation and starting the flushing operation by utilizing the normal supply of hard water to act as a valve and shut off the supply of regenerating liquid, and utilizing a portion of this supply of hard water to raise the level of the regenerating liquid in its supply container.

6. Water softening apparatus, comprising a softening tank, a regenerating tank, valve structure for controlling the flow of water to the softening tank and the flow of regenerating liquid to and from the softening tank, and means operable upon the movement of the valve to flushing position to cause the normal supply of hard water to shut off the supply of regenerating liquid.

7. Water softening apparatus, comprising a softening tank, a regenerating tank, valve structure for controlling the flow of water to the softening tank and the flow of regenerating liquid to and from the softening tank, means operable upon the movement of the valve to flushing position to cause the normal supply of hard water to shut off the supply of regenerating liquid, and means for conducting a portion of said hard water to the regenerating tank and a portion through the normal regenerating supply conduit to the softening tank.

8. Water softening apparatus, comprising a softening tank, a regenerating tank, valve structure for controlling the flow of water to the softening tank and the flow of regenerating liquid to and from the softening tank, means operable upon the movement of the valve to flushing position to cause the normal supply of hard water to shut off the supply of regenerating liquid, means for conducting a portion of said hard water to the regenerating tank and a portion through the normal regenerating supply conduit to the softening tank, and means controlled by the level of the liquid in the regenerating tank for controlling the duration of the flushing period.

9. Water softening apparatus, comprising a softening tank containing softening materials, a regenerating tank holding a supply of regenerating liquid, means for regenerating the materials in the softening tank by the regenerating liquid and for flushing the regenerating liquid from the softening tank, and means controlled by the height of liquid in the regenerating tank for controlling the duration of the regenerating operation and the flushing operation.

10. Water softening apparatus, comprising softening means, regenerating means and flushing means, and means controlled by the supply of regenerating liquid for controlling the duration of the regeneration operation and flushing operation.

11. Water softening apparatus, comprising a softening tank, a regenerating tank, a valve housing for controlling the flow of water to said softening tank and to said regenerating tank and a supply of regenerating liquid to and from said softening tank, a rotatable valve seat in said valve housing, a float in said regenerating tank, and means connecting said float and said rotatable valve for controlling the duration of the regenerating operation and flushing operation.

12. Water softening apparatus, comprising a softening tank, a regenerating tank, a valve housing for controlling the flow of water to said softening tank and to said regenerating tank, and a supply of regenerating liquid to and from said softening tank, a rotatable valve seat in said valve housing, a float in said regenerating tank, and means connecting said float and said rotatable valve for controlling the duration of the regenerating operation and flushing operation, and means controlled by movement of the valve and flushing operation to admit hard water to said regenerating tank to raise the float therein and thus control the length of the flushing operation.

13. Water softening apparatus, comprising a softening tank, a regenerating tank, a valve housing for controlling the flow of water to said softening tank and to said regenerating tank, and a supply of regenerating liquid to and from said softening tank, a rotatable valve seat in said valve housing, a float in said regenerating tank, means connecting said float and said rotatable valve for controlling the duration of the regenerating operation and flushing operation, means controlled by movement of the valve and flushing operation to admit hard water to said regenerating tank to raise the float therein and thus control the length of the flushing operation, and means for regulating the supply of water to said regenerating tank during the flushing operation whereby to regulate the duration of the flushing operation.

14. Water softening apparatus, comprising a softening tank, a regenerating tank, a valve housing having a hard water inlet and soft water outlet, an injector inlet to the softening tank, a regenerating liquid connection between the regenerating tank and said injector inlet, means for directing incoming hard water through said injector and into the softening tank whereby to draw in a supply of regenerating liquid to regenerate said softening tank and means for directing an additional supply of hard water to cut off a supply of regenerating liquid, some of said additional supply of hard water being conducted through the normal regenerating liquid line through the injector and into the softening tank to flush the same.

15. Water softening apparatus, comprising a softening tank, a regenerating tank, means for controlling the regeneration of the materials in the softening tank by the regenerating liquid, and means controlled by the height of the liquid in the regenerating tank for successively controlling the duration of the regenerating operation and the flushing operation.

16. Water softening apparatus, comprising a softening tank, a regenerating tank, means for controlling the regeneration of the materials in the softening tank by the regenerating liquid from the regenerating tank, and means controlled by the lowering of the level of liquid in the regenerating tank to a predetermined position for controlling the duration of the regenerating operation and by the raising of the level of the liquid in the regenerating tank to a predetermined point to control the duration of the flushing period.

In testimony whereof I affix my signature.

MELVIN SHETLER.